United States Patent
Alon

(10) Patent No.: US 9,698,777 B1
(45) Date of Patent: Jul. 4, 2017

(54) SECURED KEYBOARD READOUT USING CAPACITANCE MATRIX

(71) Applicant: Nuvoton Technology Corporation, Hsin-chu (TW)

(72) Inventor: Moshe Alon, Tel-Aviv (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 0 days.

(21) Appl. No.: 15/161,327

(22) Filed: May 23, 2016

(51) Int. Cl.
*G08B 6/00* (2006.01)
*H03K 17/98* (2006.01)
*G06F 3/01* (2006.01)
*H03K 17/96* (2006.01)

(52) U.S. Cl.
CPC ............ *H03K 17/98* (2013.01); *G06F 3/016* (2013.01); *H03K 17/962* (2013.01); *H03K 17/9622* (2013.01)

(58) Field of Classification Search
CPC ...................................................... G06F 3/016
USPC ........................................ 340/407.2; 341/22
See application file for complete search history.

(56) References Cited

U.S. PATENT DOCUMENTS

| 3,691,555 | A | * | 9/1972 | Looschen | B41J 5/105 |
| | | | | | 341/33 |
| 4,234,871 | A | * | 11/1980 | Guglielmi | H03K 17/98 |
| | | | | | 341/33 |
| 5,790,054 | A | * | 8/1998 | Hsu | H03M 11/20 |
| | | | | | 341/22 |
| 6,426,710 | B1 | * | 7/2002 | Chang | G06F 21/31 |
| | | | | | 340/14.1 |
| 2002/0180623 | A1 | * | 12/2002 | Kuo | H03M 11/20 |
| | | | | | 341/26 |
| 2011/0095919 | A1 | | 4/2011 | Ostermoller et al. | |
| 2011/0152987 | A1 | | 6/2011 | Wahlgren et al. | |
| 2012/0068964 | A1 | * | 3/2012 | Wright | G06F 3/03545 |
| | | | | | 345/174 |

* cited by examiner

*Primary Examiner* — Carlos E Garcia
(74) *Attorney, Agent, or Firm* — D. Kligler IP Services Ltd.

(57) ABSTRACT

An apparatus includes a keyboard and circuitry. The keyboard includes at least an interface line and a key. The key is configured to connect the interface line to first and second different capacitances when positioned in first and second positions, respectively. The circuitry is connected to the interface line and is configured to detect whether the key is in the first position or in the second position, by sensing electrical current flowing on the interface line in response to a stimulation waveform.

13 Claims, 2 Drawing Sheets

US 9,698,777 B1

SECURED KEYBOARD READOUT USING CAPACITANCE MATRIX

FIELD OF THE INVENTION

The present invention relates generally to data security, and particularly to methods and systems for secure readout of a keyboard.

BACKGROUND OF THE INVENTION

In various applications a person is required to provide confidential information, such as a personal identification number (PIN) in automatic teller machines (ATM) and a user ID number in mobile point of sale (POS) terminals. Typically, the confidential information is provided via a man-machine interface such as a keyboard. The keyboard and its interfaces may be vulnerable to attacks in which an unauthorized party attempts to recognize the input confidential information. Examples of prior art techniques for preventing keyboard attacks are provided below.

U.S. Pat. No. 6,426,710, whose disclosure is incorporated herein by reference, describes a security keyboard matrix scanning method. The method utilizes bi-directional input/output ports (e.g., X-port and Y-port), in which each line of the X-port and the Y-port can be selectively designated as a sensing line or an output line, to construct the X-port and Y-port such that at least one line of one of the two ports can output a scanning signal representative of a dummy scanning signal at the time the actual scanning signal is output from another line of either port.

U.S. Patent Application Publication 2011/0095919, whose disclosure is incorporated herein by reference, describes a keyboard having a plurality of key fields and a plurality of capacitive elements, which are associated with the key fields, and measuring electronics. The measuring electronics are implemented for the purpose of detecting a change of the capacitance value of one of the capacitive elements between a non-actuation level, which is in a first capacitance value range, and an actuation level, which is in a second capacitance value range, and then outputting an actuation signal. An attempt to manipulate the keyboard can thus be detected on the basis of the capacitance value increase associated therewith.

SUMMARY OF THE INVENTION

An embodiment of the present invention that is described herein provides an apparatus including a keyboard and circuitry. The keyboard includes at least an interface line and a key. The key is configured to connect the interface line to first and second different capacitances when positioned in first and second positions, respectively. The circuitry is connected to the interface line and is configured to detect whether the key is in the first position or in the second position, by sensing electrical current flowing on the interface line in response to a stimulation waveform.

In some embodiments, the circuitry is configured to sense the electrical current by integrating a voltage across a resistance that the electrical current flows through, over a predefined time interval. In some embodiments, the circuitry includes a waveform generator that is configured to produce the stimulation waveform. In a disclosed embodiment, the waveform generator is configured to produce the stimulation waveform with rise and fall times that are longer than a Resistance-Capacitance (RC) time constant of the interface line and the first or second capacitances. In an embodiment, the waveform generator is connected to the interface line via a series resistor, and is configured to receive feedback indicative of the voltage drop across the series resistor and to adjust the stimulation waveform based on the feedback to compensate for the voltage drop.

In an example embodiment, the at least interface line includes a matrix including first and second interface lines that intersect at the key, wherein in the first position the first interface line is connected to a first capacitor and the second interface line is connected to a second capacitor, and in the second position the key connects the first and second capacitors in parallel to both the first and the second interface lines. In an embodiment, a voltage applied over the at least interface line does not change when the position of the key changes between the first and second positions.

There is additionally provided, in accordance with an embodiment of the present invention, a method including connecting at least an interface line of a keyboard to first and second different capacitances, by positioning a key of the keyboard in first and second positions, respectively. Using circuitry that is connected to the keyboard by the interface line, a detection is made whether the key is in the first position or in the second position, by sensing electrical current flowing on the interface line in response to a stimulation waveform.

The present invention will be more fully understood from the following detailed description of the embodiments thereof, taken together with the drawings in which:

DETAILED DESCRIPTION OF EMBODIMENTS

Overview

Figure 1:
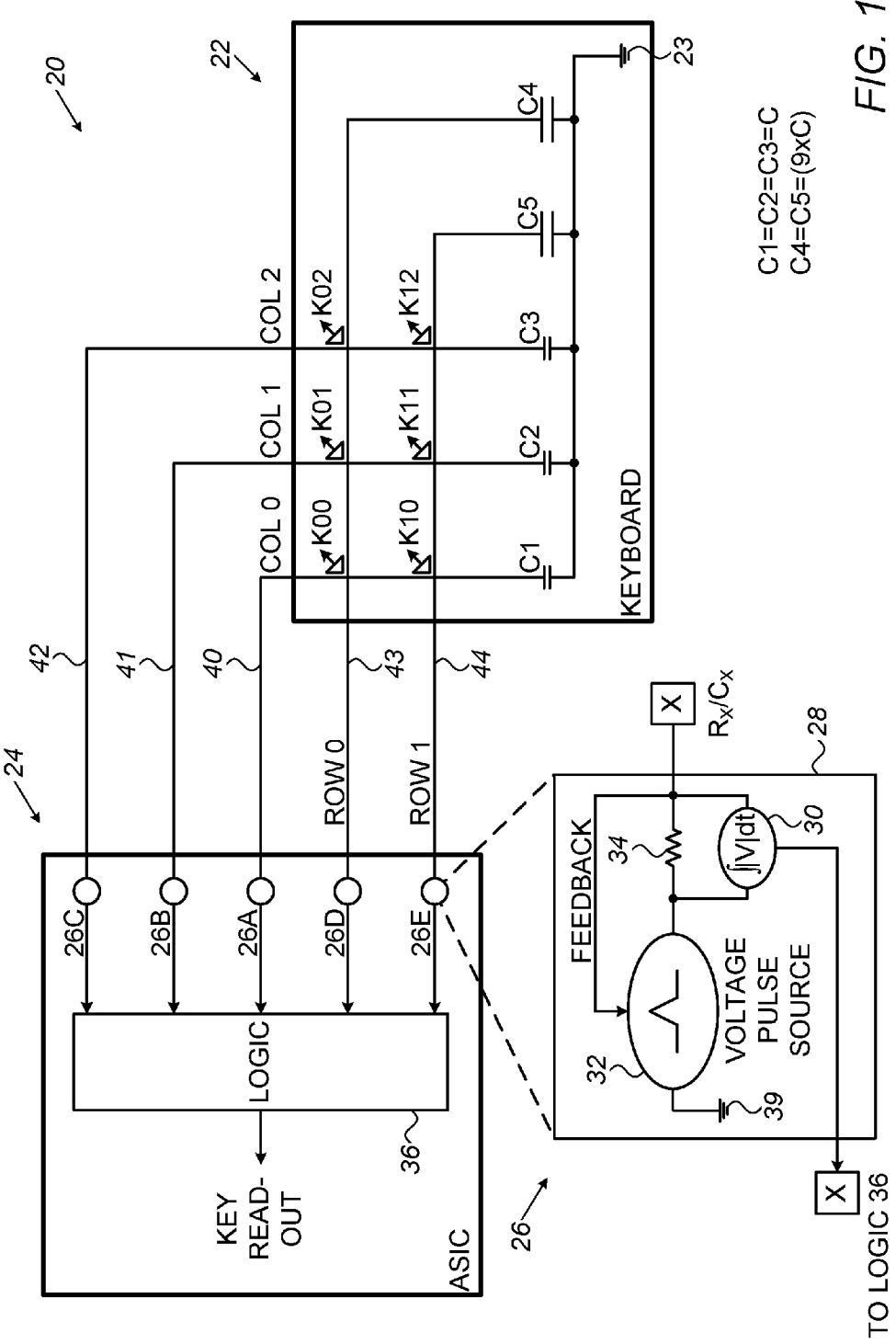
FIG. 1 is a block diagram that schematically illustrates a secured keyboard system, in accordance with an embodiment of the present invention.

Keyboards are used in various applications, such as in mobile point of sale (POS) terminals or in various computing devices. Keyboards may be used for inputting various types of information including confidential information, such as personal identification number (PIN) code. A keyboard may therefore be a target for hacking attacks that attempt to obtain such information.

Consider, for example, a hypothetical keyboard that comprises a matrix of keys, each key connecting a column-line and a row-line. Such a keyboard may be read by applying pulses to the column-lines and monitoring the row-lines. When pressing a given key, the column-line and row-line that intersect at the given key become connected together and the pulse can be sensed on the row-line. An eavesdropper may recognize the column-line and the row-line on which the pulse appears simultaneously, and conclude which key was pressed. Such an attack is simple to launch, e.g., using a simple voltmeter, and difficult to detect.

Embodiments of the present invention that are described hereinbelow provide improved techniques for reading keyboards in a manner that is protected from hacking attacks. In some embodiments, each column-line and row-line is connected to ground potential via a respective capacitor at one end, and to a respective interface line at the other end. The capacitance of the capacitors connected to the row-lines is referred to herein as "row capacitance," and the capacitance of the capacitors connected to the column-lines is referred to herein as "column capacitance." The row capacitance is different from the column capacitance. When a key is pressed, the interface line connected to the column-line, and the interface line connected to the row-line, are both connected to the sum of the row and column capacitances.

In some embodiments, a sequence of voltage pulses having a predefined waveform (e.g., a triangular waveform) is applied by multiple voltage sources to the row-lines and column-lines. In an embodiment, each interface line is connected to a respective current measurement circuitry comprising an integrator that senses and integrates the absolute value of a voltage across a resistance that the current flow through, over a period of the pulse sequence. The outputs of the integrators connected to the various column-lines and row-lines are provided to circuitry that detects whether a key was pressed, and which key it was.

The disclosed techniques are highly effective in preventing attacks on the keyboard interface lines, because a pressed key cannot be identified by monitoring the voltage over the interface lines. When using the disclosed techniques, an attacker is unable to even determine whether a key has been pressed or not, let alone identify which key was pressed. Illegitimately sensing the current flowing through the interface lines is considerably more difficult. Furthermore, an attack by current measurement may be detected relatively easily, e.g., by detecting changes in the resistance at the respective circuitry.

System Description

FIG. 1 is a block diagram that schematically illustrates a secured keyboard system 20, in accordance with an embodiment of the present invention. System 20 comprises a capacitive matrix keyboard 22 and an application-specific integrated circuit (ASIC) 24.

In the present example, keyboard 22 comprises a matrix of six keys arranged in three columns (denoted col 0, col 1 and col 2) and two rows (denoted row 0 and row 1). Each key is identified by two indices corresponding to a respective pair of row-line and column-line. For example, k12 refers to a key located at row-line 1 and column-line 2. The columns and rows of keys are associated with respective column-lines and row-lines that are each connected to ground via a respective capacitor. For example, column-line 0 connects to ground via a capacitor C1 and row-line 0 connects to ground via a capacitor C4. The column-lines and row-lines also serve as interface lines between keyboard 22 and ASIC 24.

Column-lines 0, 1, and 2 are connected to ASIC 24 via respective wires 40, 41 and 42, and at their other ends to ground via respective capacitors C1, C2 and C3. Row-lines 0 and 1 are connected to ASIC 24 via respective wires 43 and 44, and at their other ends to respective capacitors C4 and C5. Capacitors C1, C2 and C3 are substantially similar having same capacitance denoted C. Capacitors C4 and C5 are substantially similar having, in the present example, capacitance that is nine-times higher than C (i.e., 9C). All five capacitors are connected at one end to a common ground point 23.

In the example of FIG. 1, ASIC 24 comprises five substantially similar line units 26A-26E. Wires 40-44 connect to units 26A-26E, respectively. In the example of FIG. 1, column-lines 0-2 are connected via wires 40-42 to units 26A-26C, respectively, and row-lines 0 and 1 are connected via wires 43 and 44 to units 26D and 26E, respectively.

Figure 2:
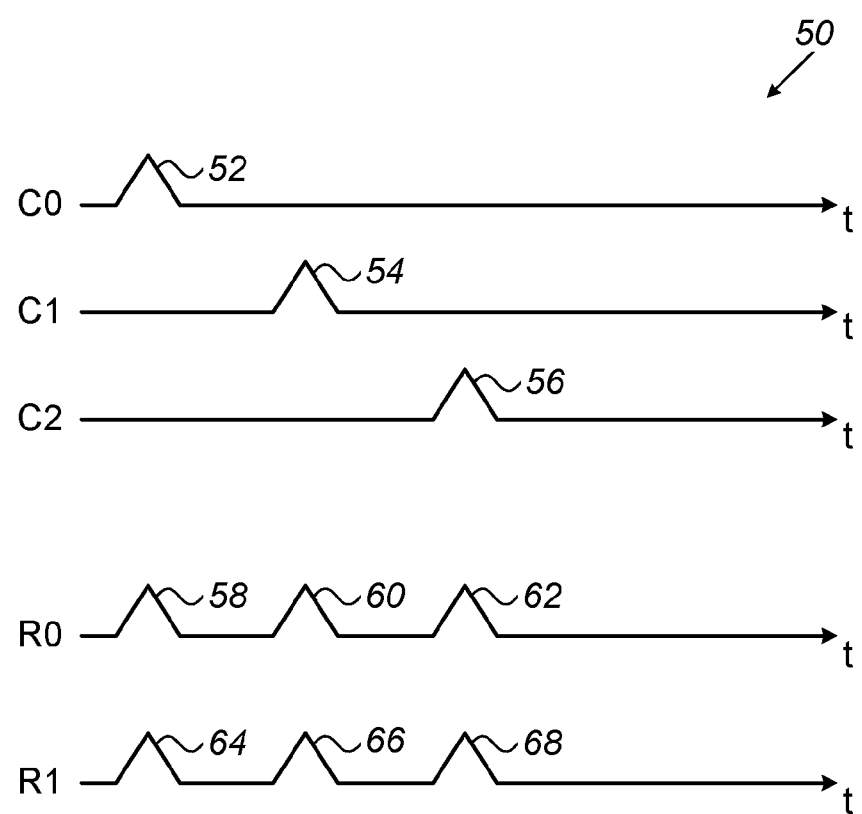
FIG. 2 is a graph that schematically illustrates a scanning scheme for a keyboard matrix, in accordance with an embodiment of the present invention.

Reference is now made to an inset 28 that depicts a detailed block diagram of one of line units 26 (e.g., unit 26E). Each line unit comprises a voltage source 32, configured to produce stimulation signals. Each signal comprises one or more stimulus pulses, such as voltage pulses having a triangular waveform as depicted in FIG. 2. Source 32 is connected to its respective column-line or row-line via a resistor 34. An integrator 30 is connected in parallel to resistor 34, and is configured to integrate the absolute value of the voltage across resistor 34 over time.

In the present example, voltage source 32 is provided with a feedback that is indicative of the voltage at the far terminal of resistor 34. Using this feedback, voltage source 32 is able to compensate for the voltage drop across resistor 34. Typically, source 32 adjusts the voltage at its own output, such that the pulses on the respective interface line (one of lines 40-44) remains substantially the same regardless of the voltage drop over resistor 34.

ASIC 24 further comprises logic 36, which receives the integrator outputs from units 26A-26C, and is configured to identify a pressed key of keyboard 22 based on the integrator outputs.

Each key in keyboard 22 has two positions: pressed, when pressed by a user, or released, when the key is untouched. Line units 26A-26E produce the voltage pulses stimulus regardless of whether any of the keys is pressed or not. When all keys are untouched, each column-line connects to a capacitance "C", and each row-line connects to a capacitance "9C". When the user presses a key intersected by a certain column-line and a certain row-line, the pressed key connects between the column-line and the row-line, causing their respective capacitors to connect in parallel.

Therefore, when a key is pressed, both its row-line and column-line are connected to a capacitance that is equal to the sum of the row-capacitance and the column capacitance. For example, when pressing key K10, the resultant capacitance of capacitors C1 (of column-line 0) and C5 (of row-line 1) equal 9C+C=10C.

The difference in capacitance between the two key positions causes different respective currents to flow through resistors 34 of line units of the row-line and column-line, and therefore results in different respective outputs of the integrators of these line units. Based on this difference, logic 36 is able to identify the pressed key. For example, logic 36 may compare the output of each integrator 30 to a threshold, which is set at the mid-point between the nominal output of the integrator when the key is pressed, and the nominal output of the integrator when the key is not pressed.

The configuration of system 20 shown in FIG. 1 is depicted purely by way of example. In alternative embodiments, any other suitable system configuration can be used. For example, FIG. 1 refers to a specific configuration of keyboard 22. In alternative embodiments, the disclosed techniques can be used, mutatis mutandis, in various other types of keyboards, such as desktop and laptop, ATMs and POS terminals. Furthermore, the number of keys in the keyboard may vary from a single key to any number of keys suitable for a desired application.

The various elements of system 20 are typically implemented in hardware as shown in the figure. Some system elements, however, for example logic 36, may also be implemented in software.

FIG. 2 is a graph 50 that schematically illustrates a scanning scheme for matrix keyboard 22, in accordance with an embodiment of the present invention. Graph 50 shows five scanning waveforms (WFs), which are produced by generators 30 of line units 26A-26C. WFs C0, C1 and C2 stimulate respective columns C0, C1 and C2, and WFs R0 and R1 stimulate respective rows R0 and R1. In the example of FIG. 2, all the WFs have a triangular shape. In other embodiments, the WFs may have any other suitable shape.

Line units 26A, 26B and 26C generate pulses 52, 54 and 56 to stimulate column-lines 0, 1 and 2, respectively, at a staggered sequence having a given frequency. To capture a pressed key, the column-lines scanning cycle is shorter than the minimal expected key-press duration. In parallel, units 26D and 26E generate pulses for stimulating rows 0 and 1, respectively, together with every pulse stimulating the columns.

In other words, a pulse stimulating a column-line is accompanied with pulses stimulating each of the row-lines at the same time. For example, pulse 52 on column-line 0 is generated simultaneously with pulses 58 and 64 generated on row-lines 0 and 1, respectively. Similarly, pulses 54, 60 and 66 are generated simultaneously over column-line 2 and row-lines 0 and 1, respectively. The WFs of all the stimulating pulses in graph 50 are substantially similar.

In some embodiments, integrator 30 of each unit 26 integrates the absolute voltage across the series resistor 34 of its respective column-line or row-line. When a user presses a key, the corresponding column-line and row-line are shorted together while the respective sources 32 continue generating substantially similar waveform pulses over the respective row-lines and column-lines.

Typically, the row-lines and column-lines do not comprise series resistances other than the negligible resistance of the wiring. The charging/discharging duration of the capacitors, which is determined by the Resistance-Capacitance (RC) time constant, is thus also close to zero. As a result, the voltage developing over the row-lines and column-lines does not change between the two key positions. Therefore, an eavesdropper who senses the voltages on wires 40-44 is unable to identify the pressed key. In some embodiments, an underlying assumption is that the rise and fall times of the pulses is designed to be significantly greater than the RC time constant.

On the other hand, the change in resultant capacitance between the two key positions causes a change to the integrators outputs that is recognized by logic 36. For example, when typing key K01, the resultant capacitance seen by units 26B and 26D together is "10C", or "5C" as seen by each unit. As a result, the resultant capacitance seen by unit 26B changes from "C", which is the capacitance of C2 before typing, to 5C, which is half of the resultant capacitance of C2+C5 after typing. Similarly, the resultant capacitance as seen by unit 26D changes from "9C" to "5C". In other words, logic 36 indicates that key K01 was pressed by receiving higher integrator output readings from unit 26B (e.g., charging "5C" rather than "C") and lower integrator output reading from unit 26D (e.g., charging "5C" rather than "9C").

Logic 36 receives the integrator outputs from units 26A-26E and determines whether the user pressed a key, and which key was pressed. In an embodiment, logic 36 holds predefined thresholds for determining the respective integrator outcomes obtained for a column-line (corresponds to "C" capacitance), a row (corresponds to "9C" capacitance), and for a pressed key (corresponds to "10C" capacitance). Logic 36 may determine the status of each key in keyboard 22 by comparing the currents to these thresholds.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   a keyboard, comprising at least a key having first and second positions, wherein the key is associated with first and second lines connected to first and second respective capacitors, and wherein the key is configured:
   in the first position, to disconnect the first line from the second line; and
   in the second position, to short between the first and second lines, such that each of the first and second lines is connected to both the first and second capacitors; and
   circuitry, which is connected to the first and second lines and comprises a current-measurement circuit that is configured to detect whether the key is in the first position or in the second position, by sensing electrical currents flowing on the first and second lines in response to a predefined stimulation waveform applied simultaneously to the first and second lines.

2. The apparatus according to claim 1, wherein the circuitry is configured to sense the electrical currents by integrating voltages across a resistances that the electrical currents flow through, over a predefined time interval.

3. The apparatus according to claim 1, wherein the circuitry comprises a waveform generator that is configured to produce the stimulation waveform.

4. The apparatus according to claim 3, wherein the waveform generator is configured to produce the stimulation waveform with rise and fall times that are longer than a Resistance-Capacitance (RC) time constant of the first and second lines and the first and second capacitors.

5. The apparatus according to claim 3, wherein the waveform generator is connected to the first and second lines via series resistors and is configured to receive feedback indicative of a voltage drop across the series resistors and to adjust the stimulation waveform based on the feedback to compensate for the voltage drop.

6. The apparatus according to claim 1, wherein a voltage applied over the first and second lines does not change when the position of the key changes between the first and second positions.

7. The apparatus according to claim 1, wherein the first capacitor has a first capacitance, and wherein the second capacitor has a second capacitance that is different from the first capacitance.

8. A method, comprising:
   applying a predefined stimulation waveform simultaneously to first and second lines, which are associated with a key of a keyboard and are connected to first and second respective capacitors, wherein the key has first and second positions such that:
   in the first position, the key disconnects between the first and second lines; and in the second position, the key shorts between the first and second lines, such that each of the first and second lines is connected to both the first and second capacitors; and detecting whether the key is in the first position or in the second position, by sensing electrical currents flowing through the first and second lines in response to the simultaneously applied predefined stimulation waveform.

9. The method according to claim 8, wherein sensing the electrical currents comprises integrating voltages across resistances that the electrical currents flow through, over a predefined time interval.

10. The method according to claim 8, and comprising producing the stimulation waveform using circuitry.

11. The method according to claim 10, wherein producing the stimulation waveform comprises generating the stimulation waveform with rise and fall times that are longer than a Resistance-Capacitance (RC) time constant of the first and second lines and the first and second capacitors.

12. The method according to claim 10, wherein producing the stimulation waveform comprises generating the stimulation waveform by voltage sources that are connected to the first and second lines via series resistors, receiving feedback indicative of a voltage drop across the series resistors, and adjusting the stimulation waveform based on the feedback to compensate for the voltage drop.

13. The method according to claim 8, wherein a voltage applied over the first and second lines does not change when the position of the key changes between the first and second positions.

\* \* \* \* \*